(12) United States Patent
Atreya et al.

(10) Patent No.: US 11,532,002 B1
(45) Date of Patent: Dec. 20, 2022

(54) SYSTEMS AND METHODS FOR A NON-FUNGIBLE TOKEN HAVING ON CHAIN CONTENT GENERATION

(71) Applicant: ConsenSys AG, Zug (CH)

(72) Inventors: Kishore Atreya, Brooklyn, NY (US);
Connor Keenan, Brooklyn, NY (US);
Ricardo Stuven, Brooklyn, NY (US);
Ruben Torres, Brooklyn, NY (US);
Samir Mehta, Brooklyn, NY (US)

(73) Assignee: CONSENSYS SOFTWARE INC., Brooklyn, NY (US)

( * ) Notice: Subject to any disclaimer, the term of this patent is extended or adjusted under 35 U.S.C. 154(b) by 0 days.

(21) Appl. No.: 17/333,901

(22) Filed: May 28, 2021

(51) Int. Cl.
*G06Q 30/02* (2012.01)
*G06Q 20/36* (2012.01)
*G06Q 30/06* (2012.01)
*H04L 9/32* (2006.01)
*H04L 9/00* (2022.01)

(52) U.S. Cl.
CPC ......... *G06Q 30/0206* (2013.01); *G06Q 20/36* (2013.01); *G06Q 30/0283* (2013.01); *G06Q 30/0613* (2013.01); *H04L 9/3236* (2013.01); *H04L 9/3239* (2013.01); *H04L 9/3265* (2013.01); *G06Q 2220/10* (2013.01); *G06Q 2220/12* (2013.01); *H04L 9/50* (2022.05); *H04L 2209/60* (2013.01)

(58) Field of Classification Search
CPC ........... G06Q 30/0206; G06Q 30/0283; G06Q 30/0613; G06Q 20/36; G06Q 2220/10; G06Q 2220/12; H04L 9/3236; H04L 9/3239; H04L 9/3265; H04L 9/50; H04L 2209/60
USPC ........................................................ 705/50
See application file for complete search history.

(56) References Cited

U.S. PATENT DOCUMENTS

| | | | |
|---|---|---|---|
| 2019/0220836 A1* | 7/2019 | Caldwell | G06Q 20/3829 |
| 2020/0005284 A1* | 1/2020 | Vijayan | H04L 63/08 |
| 2021/0201336 A1* | 7/2021 | Mallett | G06F 3/011 |
| 2021/0357447 A1* | 11/2021 | McKenzie | G06F 16/638 |

OTHER PUBLICATIONS

Create NFTs for Free-OpenSea (hereafter 'Create NFTs', downloaded from https://opensea.io/blog/announcements/introducing-the-collection-manager/ and attached as a PDF file, as well as PDF file of screen shot for date support of Dec. 29, 2020, (Year: 2020).*
CreateNFTFreeOpenSeaBrowser, from p. 4 of file which did not reproduce well in PDF of full blog (Year: 2020).*
CreateNFTFreeOpenSeaBrowserView, which shows screen shot of Wayback Machine with priority date displayed, showing NFTs viewable on generic browser), (Year: 2020).*

(Continued)

*Primary Examiner* — James D Nigh

(57) ABSTRACT

A blockchain platform is provided for creating original non-fungible tokens (NFTs) and prints of the original NFTs. The platform creates a market for purchasing and selling prints of the original NFTs. The purchase price and the sale price for a print is determined based on a bonding curve and a total supply of the prints of the original NFT. The platform may also generate content (e.g., artwork and/or music) associated with the original NFTs. The content may be generated from logic that is stored on the blockchain.

16 Claims, 5 Drawing Sheets

(56) References Cited

OTHER PUBLICATIONS

Tiny Boxes, ("NFTeam Announces Chainlink VRF Integration to Power Tiny Boxes—an on Chain Generative Art Project", downloaded from https://www.chainlinkecosystem.com/ecosystem/tiny-boxes/and attached as PDF file (Year: 2020).*
NFT Bible, "The Non-Fungible Token Bible: Everything you need to know about NFTs", dated Jan. 10, 2020, downloaded from https://blog.opensea.io/guides/non-fungible-tokens/ and attached as PDF file (Year: 2020).*
Splitting NFTs ("Splitting Non-Fungible Tokens into Share$ featuring NFette", downloaded from https://www.linumlabs.com/articles/splitting-non-fungible-tokens-into-shares-featuring-nfette, dated Jan. 21, 2021), (Year: 2021).*
How to make an NFT ("How to Make an NFT and Render it on the OpenSea Marketplace", downloaded from https://www.freecodecamp.org/news/how-to-make-an-nft-and-render-on-opensea-marketplace/ and attached as a PDF file; dated Apr. 1, 2021). (Year: 2021).*
Twitter Bonding Curves (downloaded from https://twitter.com/ethlings/status/1387077204656459782 , attached as PDF file). (Year: 2021).*
12. "EulerBeats and The Future of NFTs", downloaded from https://www.one37pm.com/nft/music/eulerbeats-nfts-enigma and attached as a PDF file; dated Mar. 16, 2021 (Year: 2021).*
Art Blocks ("Art Blocks, A venue for generative art hosted and authenticated immutably on the Ethereum blockchain", dated Mar. 11, 2021, https://blog.opensea.io/guest-post/art-blocks/, attached as a PDF file (Year: 2021).*
"How Art Blocks Works in Depth", downloaded from https://artblocks.io/learn, provided as PDF file of screenshot of Wayback from Feb. 24, 2021, downloaded from https://web.archive.org/web/20210224194718/https://artblocks.io/learn , attached as PDF file), (Year: 2021).*
p5.js (available at https://p5js.org/, attached as a PDF file of screenshot from Wayback Machine, downloaded from https://web.archive.org/web/20200513020049/https://p5js.org/ (Year: 2020).*
Splitting NFTs ("Splitting Non-Fungible Tokens into Share$ featuring NFette", downloaded from https://www.linumlabs.com/articles/splitting-non-fungible-tokens-into-shares-featuring-nfette, dated Jan. 21, 2021, attached as PDF file (Year: 2021).*
How to Create NFTs With Solidity (downloaded from https://betterprogramming.pub/how-to-create-nfts-with-solidity-4fa1398eb70a and attached as PDF file (Year: 2021).*
Bonding Curves—The What, Why, and Shapes Behind Them, downloaded from https://www.linumlabs.com/articles/bonding-curves-the-what-why-and-shapes-behind-it , dated Dec. 1, 2020 and attached as a PDF file. (Year: 2020).*
Art Blocks ("Art Blocks, A venue for generative art hosted and authenticated immutably on the Ethereum blockchain", dated Mar. 11, 2021, https://blog.opensea.io/guest-post/art-blocks/, previously attached as a PDF file), (Year: 2021).*
"How Art Blocks Works in Depth", downloaded from https://artblocks.io/learn, previously provided as PDF file of screenshot of Waybackfrom Feb. 24, 2021, downloaded from https://web.archive.org/web/20210224194718/https://artblocks.io/learn , previously attached as PDF file), (Year: 2021).*
p5.js (available at https://p5js.org/, previously attached as a PDF file of screenshot from Wayback Machine, downloaded from https://web.archive.org/web/20200513020049/https://p5js.org/ (Year: 2020).*
"Creating Music From Geometry With Geomusica", downloaded from https://derivative.ca/community-post/creating-music-geometry-geomusica/63243 , dated Dec. 21, 2020 and attached as a PDF file; this reference cites example "Piano #6", downloaded from https://www.youtube.com/watch?v=arLOAssb8zg&t=53s ). (Year: 2020).*
Splitting NFTs ("Splitting Non-Fungible Tokens into Share$ featuring NFette", downloaded from https://www.linumlabs.com/articles/splitting-non-fungible-tokens-into-shares-featuring-nfette, dated Jan. 21, 2021, previously attached as PDF file) (Year: 2021).*
Twitter Bonding Curves (downloaded from https://twitter.com/ethlings/status/1387077204656459782 , previously attached as PDF file). (Year: 2021).*
How to Create NFTs With Solidity (downloaded from https://betterprogramming.pub/how-to-create-nfts-with-solidity-4fa1398eb70a and previously attached as PDF file). (Year: 2021).*

\* cited by examiner

SYSTEMS AND METHODS FOR A NON-FUNGIBLE TOKEN HAVING ON CHAIN CONTENT GENERATION

TECHNICAL FIELD

The present disclosure relates generally to blockchain and distributed ledger system and more particularly to non-fungible tokens (NFT).

BACKGROUND

Blockchain technology utilizes a data structure that stores a list of transactions and can be thought of as a distributed electronic ledger that records transactions between source identifier(s) and destination identifier(s). The transactions are bundled into blocks and every block (except for the first block) refers back to or is linked to a prior block in the chain. Computer nodes maintain the blockchain and cryptographically validate each new block and thus the transactions contained in the corresponding block. Importantly, the validation process provides a consensus mechanism, which allows for the trustless exchange of value over communications networks, such as the Internet.

Blockchain technology has aided the growth of markets for virtual goods. A prominent example are non-fungible tokens (NFTs). A non-fungible token (NFT) is a unit of data on the distributed ledger of the blockchain, where each NFT can represent a unique digital item. NFTs can represent digital files such as art, audio, videos, items in video games and other forms of creative work. While the digital files themselves are infinitely reproducible, the NFTs representing them are tracked on their underlying blockchains and provide buyers with proof of ownership.

SUMMARY

A blockchain platform is disclosed that creates original non-fungible tokens (NFTs), prints of the original NFTs, and a market for purchasing and selling prints of the original NFTs.

A blockchain platform is also disclosed that creates original non-fungible tokens (NFTs) having a token seed and that generates content (e.g., artwork and/or music associated with the original NFT using logic stored on the blockchain and a token seed.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
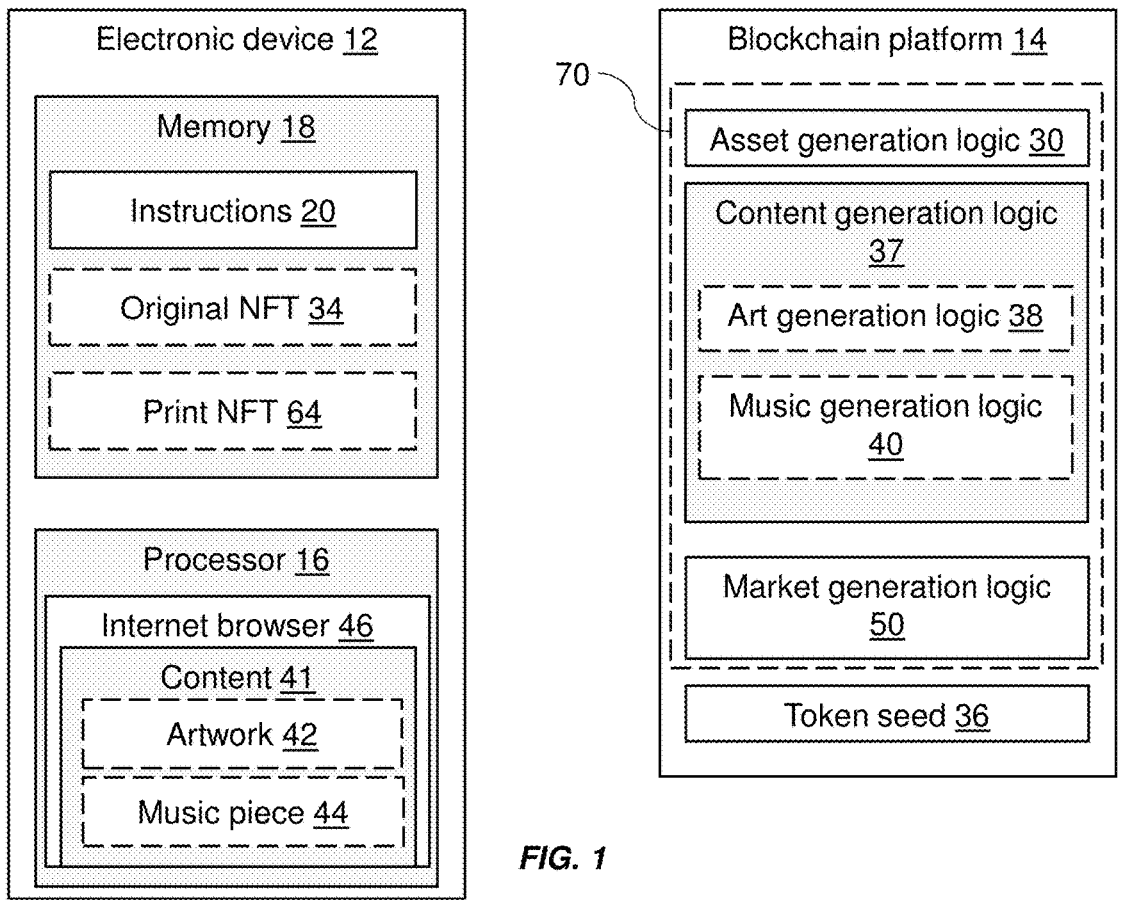
FIG. 1 is a block diagram of an exemplary blockchain system.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to aspects of the disclosure, a blockchain platform is disclosed that is a trustless, decentralized system that creates original non-fungible tokens (NFTs) and prints of the original NFTs. The platform creates a market for purchasing and selling prints of the original NFTs. For an original NFT, a purchase price is determined for generating a print of the original NFT. The purchase price is determined based on a bonding curve and a total supply of the prints of the original NFT. A sale price is also determined for prints of the original NFT. The sale price is determined based on the bonding curve and a total supply of the prints of the NFT. When a print of the original NFT is purchased, a percentage of the purchase price may be automatically transferred to the owner of the original NFT.

According to other aspects of the disclosure, a blockchain platform is disclosed that is a trustless, decentralized system that creates original non-fungible tokens (NFTs) and content (e.g., artwork and/or music) associated with the original NFTs. Each original NFT includes a token seed that may be stored on the blockchain. The content may be generated from logic that is stored on the blockchain. For example, both the logic for generating the content and the token seed for generating the content for an original NFT may be stored on the blockchain.

In the embodiment shown in FIG. 1, a system 10 is provided including an electronic device 12 and a blockchain platform 14. The electronic device 12 includes a processor 16 and a memory 18 storing processor-executable instructions 20. The instructions 20 cause the processor 16 to perform method steps. For example, the instructions may cause the processor 16 to perform the allocation of the various logics on the blockchain platform 14 as described above.

Figure 2:
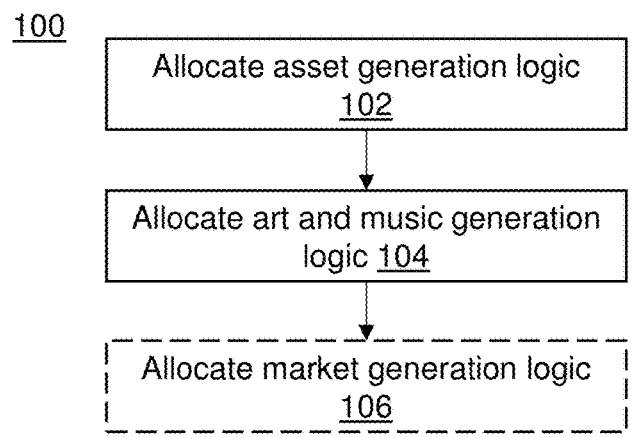
FIG. 2 is an exemplary flowchart of a method for provisioning music and art generation on a blockchain platform.

In the embodiment shown in FIG. 2, a method 100 for provisioning music and art generation on a blockchain platform is shown. In step 102, asset generation logic 30 is allocated on the blockchain platform 14. The asset generation logic includes one or more processor-executable instructions that when executed cause the blockchain platform to generate an original non-fungible token (NFT) 34 having a token seed 36. The token seed 36 may be generated on or off of the blockchain platform 14. The asset generation logic 30 may cause the blockchain platform 14 to generate the original NFT 34 after receiving a user request. Alternatively, the system 10 may generate the original NFT 34 without receiving a user request. For example, the system 10 may generate the original NFT 34 and then offer the original NFT 34 for sale (e.g., via auction).

In step 104, content generation logic 37 is allocated on the blockchain platform 14. For example, the content generation logic 37 may include at least one of art generation logic 38 or music generation logic 40. The content generation logic 37 includes one or more processor-executable instructions written in a general-purpose programming language that when executed generate content 41 of the original NFT 34 from the token seed 36 of the original NFT 34. For example, the content 41 may include at least one of a visual artwork 42 or a music piece 44. The content 41 is generated such that it is playable on an internet browser 46 by utilizing the general-purpose programming language of the content generation logic 37 on the blockchain platform. For example, when the content 41 includes visual artwork 42 and a music piece 44, both are playable on an internet browser 46 by utilizing the general-purpose programming language of the art and music generation logic 38, 40.

In an embodiment, the visual artwork and the music piece are directly playable on the internet browser without requiring an interpreter. For example, the general-purpose programming language of the content generation logic 37 may be written using any suitable programming language, such as JavaScript, Java, C, C#, C++, Python, Java, Go, R, Swift, PHP, etc. In one embodiment, the content generation logic 37 are stored in the blockchain 14 as JavaScript that is retrieved from the blockchain 14 and executed by an internet browser 46. When executed by the internet browser 46 using the token seed 36, the artwork 42 and music piece 44 are generated.

Figure 3A:
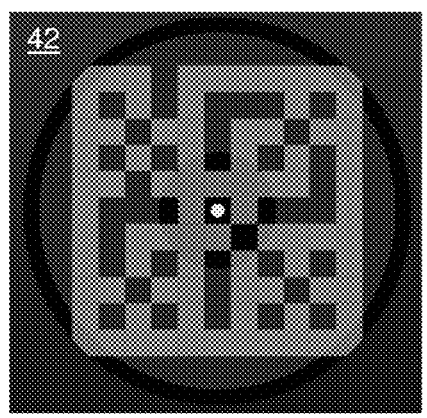
FIG. 3A is an exemplary artwork at a first time point.
Figure 3B:
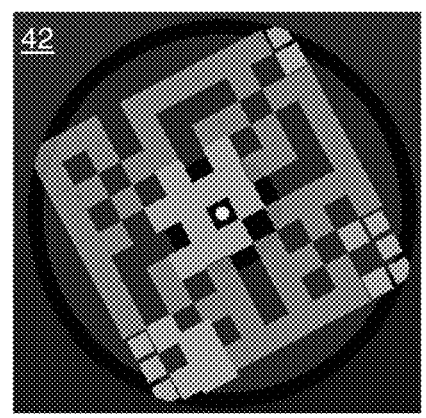
FIG. 3B is the artwork of FIG. 3A at a second time point.

Exemplary content 41 including artwork 42 is shown in FIGS. 3A and 3B. In this embodiment, the artwork 42 may change with time along with the music piece 44. The artwork 42 is shown at two different time points in FIGS. 3A and 3B. The artwork and music may be algorithmically generated using any suitable function. For example, the content generation logic 37 may use Euler totient functions. Euler's totient functions (also referred to as Euler's phi function) count the positive integers up to a given integer n that are relatively prime to n. In other words, it is the number of integers k in the range 1≤k≤n for which the greatest common divisor gcd(n, k) is equal to 1. The integers k of this form are sometimes referred to as totatives of n. In the embodiment shown in FIGS. 3A and 3B the artwork has the following traits: grid size ranges from being a 7×7 to a 12×12 symmetrical matrix; diagonal lever is a combined lever that shifts both the horizontal (X) and vertical (Y) viewing window of the typical Euler's totient Phi (φ) graph; horizontal lever shifts the viewing window of the typical Euler's totient Phi (φ) graph horizontally in addition to the diagonal lever (these levers help to produce interesting view patterns and also eliminates some edge conditions like an empty area); color palette determines the color of the cells and the color of the shape that decorate the cells; and there are 4 shapes that render the cells that are relatively prime to the rows and columns they represent (e.g., the shapes may be used to render each cell represent the rarity). For example, the probability of generating the particular shape may be as follows: circle (70%), square (10%), square circle (10%), square diamond (10%).

In one embodiment, the coprimes matrix of the artwork may be used as input to generate the rhythmic base of the music piece. The first bottom rows and last column may be assigned to different percussion instruments. The dynamic accent may come from the count of coprimes in each column and row (a partial totient function of sorts) at every beat, so beat intensity may be higher for prime numbers. The token seed may be used to randomly generate chord progressions and arpeggios using a music theory engine.

Figure 4:
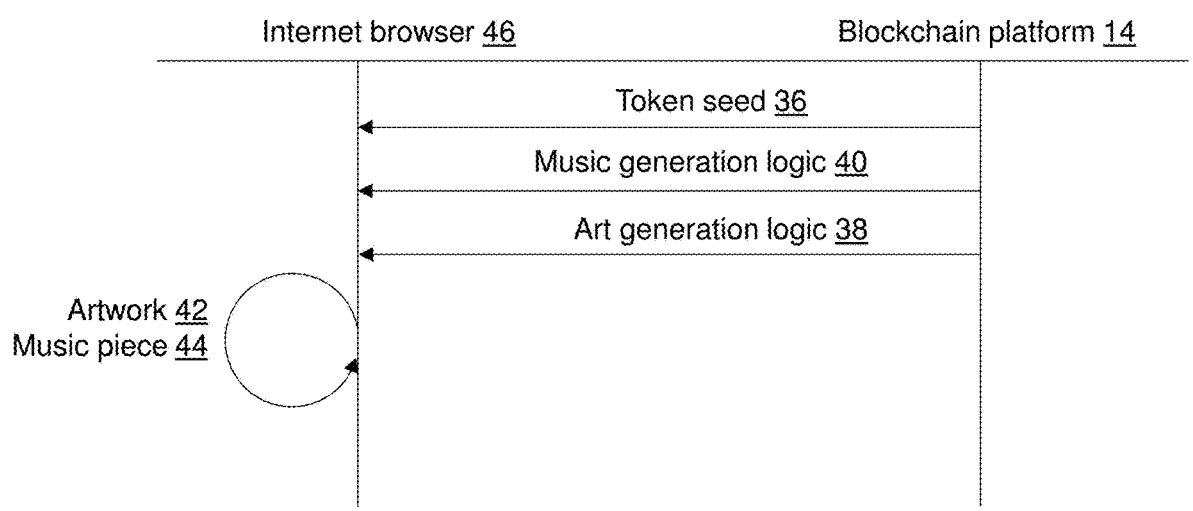
FIG. 4 is a ladder diagram of an exemplary embodiment of the method of FIG. 2.

In the embodiment shown in FIG. 4, generation of content 41 including artwork 42 and a music piece 44 is shown. The internet browser receives the token seed 36, the music generation logic 40, and the art generation logic 38 from the blockchain platform 14. The internet browser 46 executes the art and music generation logic 38, 40 with the token seed 36 as an input to generate the artwork 42 and the music piece 44.

Figure 5:
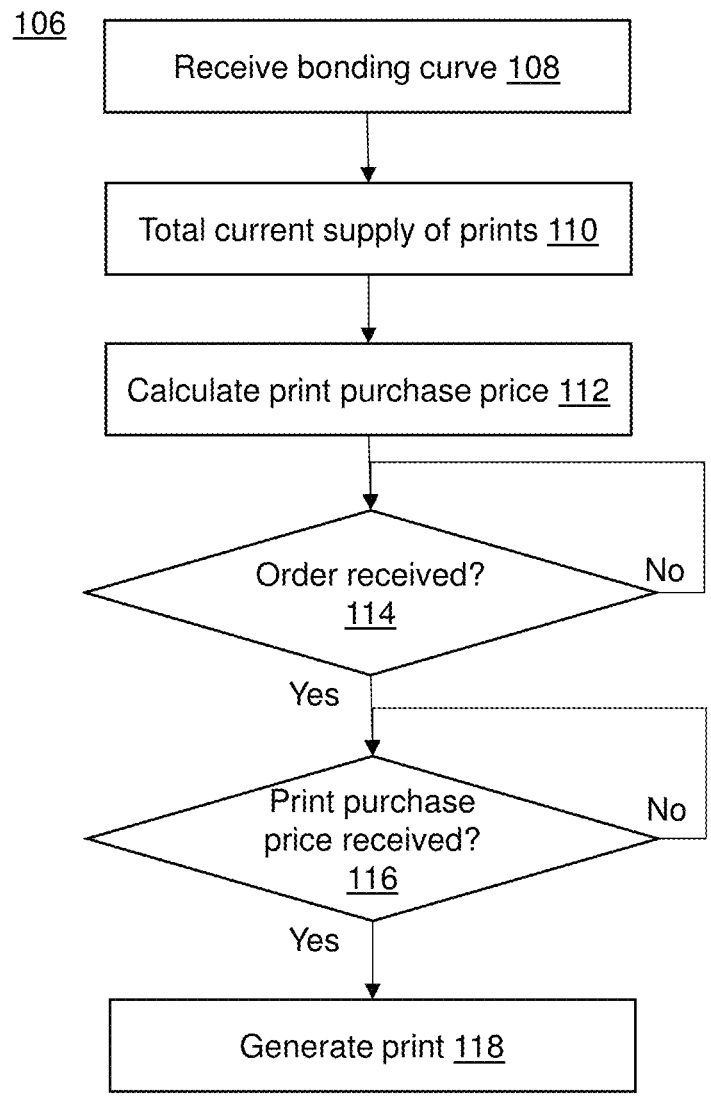
FIG. 5 is an exemplary body of a flowchart of a method for generating a market for tokens on a blockchain platform.

Returning to FIG. 2, in optional step 106, market generation logic 50 is allocated on the blockchain platform. The market generation logic 50 includes one or more processor-executable instructions that when executed cause the blockchain platform to generate a market for tokens on a blockchain platform 14. In the embodiment shown in FIG. 5, steps for generating the market are shown. In step 108, a bonding curve 62 is received. In step 110, the total current supply of prints (i.e., the number of currently existing prints) is received. In step 112, the print purchase price for generating a print of the original NFT as a semi-fungible NFT is calculated based on the bonding curve and the total current supply of prints of the original NFT. That is, for an original NFT, the bonding curve 62 is used to calculate a purchase price (also referred to as a buy price) and a sale price (also referred to as a burn price) based on a total current supply of prints of the original NFT. In step 110, the total current supply of prints 64 is received. The total current supply of the prints of the original NFT is a number of existing prints of the original NFT that are currently in supply.

The prints of the original NFT may be fungible tokens, such as semi-fungible tokens (i.e., fungible tokens associated with an NFT). For example, the original NFT and prints of the original NFT may be generated according to the ERC1155 standard.

Figures 6, 7:
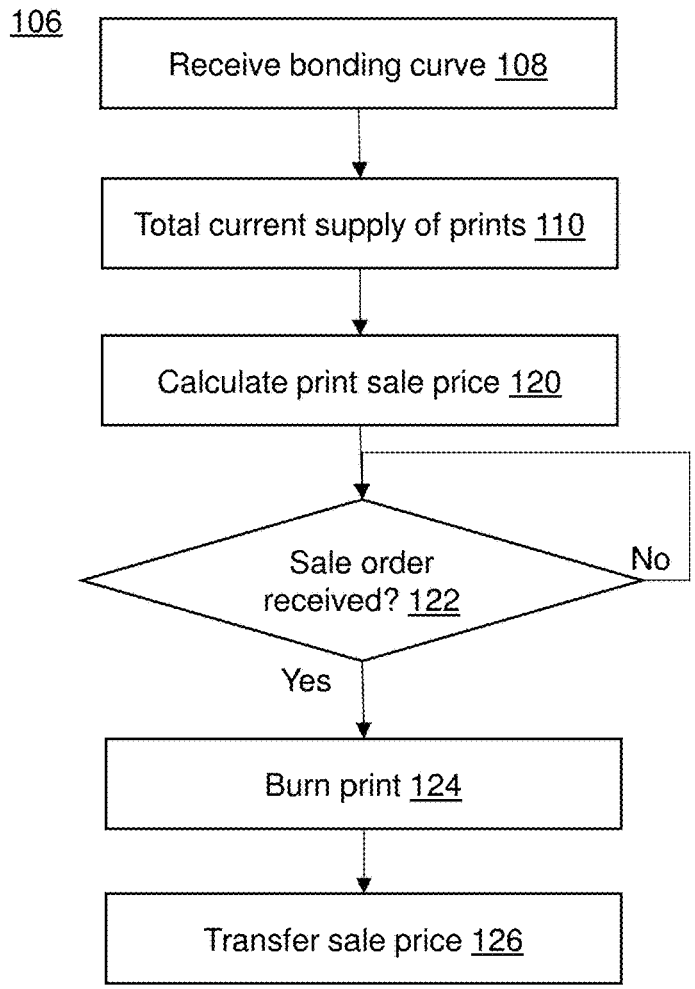
FIG. 6 is an exemplary bonding curve used to calculate a sale and purchase price of a print of an original NFT.
FIG. 7 is another exemplary body of a flowchart of a method for generating a market for a token on a blockchain platform.

An exemplary bonding curve 62 is shown in FIG. 6. As depicted, the sale price and purchase price increase as the number of existing prints increases. The prints 64 may be created and burned (i.e., purchased and sold) to either increase or decrease the total current supply of prints 64 and, in this way, the sale price and purchase price may both increase or decrease. The bonding curve 64 is a mathematical curve that defines a relationship between price and token supply. For example, the bonding curve 62 may be any positively increasing function, such as linear, exponential, sigmoidal, etc. In the embodiment shown in FIG. 6, the bonding curve 64 prices the prints based on the following function: $f(x)=a(b+x)+cx+d$, where x denotes the current print supply+1, $a=1.1$, $b=-50$, $c=0.026$, and $d=-0.008$.

In step 114, when a print purchase order is received processing moves to step 116, otherwise processing returns to step 114. In step 116 (after a print purchase order has been received), when electronic funds covering the print purchase price have been transferred to a reserve fund from a user, processing moves to step 118, otherwise processing returns to step 116. In step 118, a transaction on the blockchain platform 14 is executed to generate a print 64 of the original NFT 34 having a print token seed based on the token seed 36 of the original NFT 34, such that the content 41 of the original NFT are generatable using the content generation logic 37 and the token seed of the print 64 of the original NFT.

While treated as separate tokens, the print token seed of the print of the original NFT may match the token seed of the original NFT. For example, the print token seed may point to the token seed 36 of the original NFT. In one embodiment, the token seed 36 is the identifier for the original NFT and is also an input for determining the purchase price.

In an embodiment, when the electronic funds for the new print of the original NFT have been transferred to the reserve fund, the blockchain platform 14 may automatically transfer an ownership percentage of the electronic funds to an owner wallet and/or transfer an operator percentage of the electronic funds to a network operator wallet. For example, a predetermined percentage of the purchase price (e.g., 8%) may automatically be transferred to an owner wallet (e.g., a wallet of the owner of the original NFT 14) and another predetermine percentage of the purchase price (e.g., 2%) may automatically be transferred to an operator wallet (e.g., the entity that developed the generation logic 30, 37, 50).

In the embodiment shown in FIG. 7, steps for generating the market are shown. In step 108, the bonding curve 62 is received. In step 110, the total current supply of prints (i.e., the number of currently existing prints 64) is received. In step 120, the sale price is calculated for burning a print 64 of the original NFT 34 based on the bonding curve 62 and the total current supply of prints of the original NFT. In step 122 if a sale order is received, processing moves to step 124. Otherwise, processing returns to step 122. In step 124, when a print sale order has been received from a selling user that owns one of the existing prints 64 of the original NFT 34, a transaction on the blockchain platform is executed removing the existing print of the original NFT (i.e., burning the print 64) owned by the selling user from the selling user. In step 126, the sale price is transferred to a wallet of the selling user. For example, for the same number of existing prints 64, the sale price may be a defined percentage of the purchase price (e.g., 90%).

The asset generation logic 30, the content generation logic 37, and the market generation logic 50 may be allocated via a contract 70 on the blockchain platform 14. That is, the asset generation logic 30, the content generation logic 37, and the market generation logic 50 may be included in the contract 70.

In one embodiment, the asset generation logic is configured to limit the generation of the original NFT, such that a maximum number of original NFTs are generated by the asset generation logic. For example, the asset generation logic 30 may enable the generation of multiple different original NFTs, but the total number of original NFTs may be limited to a threshold number (e.g., 27). For each of the generated original NFTs, the market generation logic 50 may separately calculate the print purchase price of the original NFT based on the bonding curve 62 of the original NFT 34 and the total current supply of prints 64 of the original NFT. That is, for a first original NFT having sixteen prints, the print purchase price and the print sale price would be calculated using a bonding curve 62 and sixteen for the total supply of the prints 64. Similarly, for a second original NFT having thirteen prints, the print purchase price and the print sale price would be calculated using a bonding curve 62 and thirteen for the total supply of the prints 64. The original NFTs 34 may use different instances of the same bonding curve 62. instead of using the same bonding curve 64, the original NFTs 34 may use different bonding curves (e.g., having different shapes).

Figure 8:
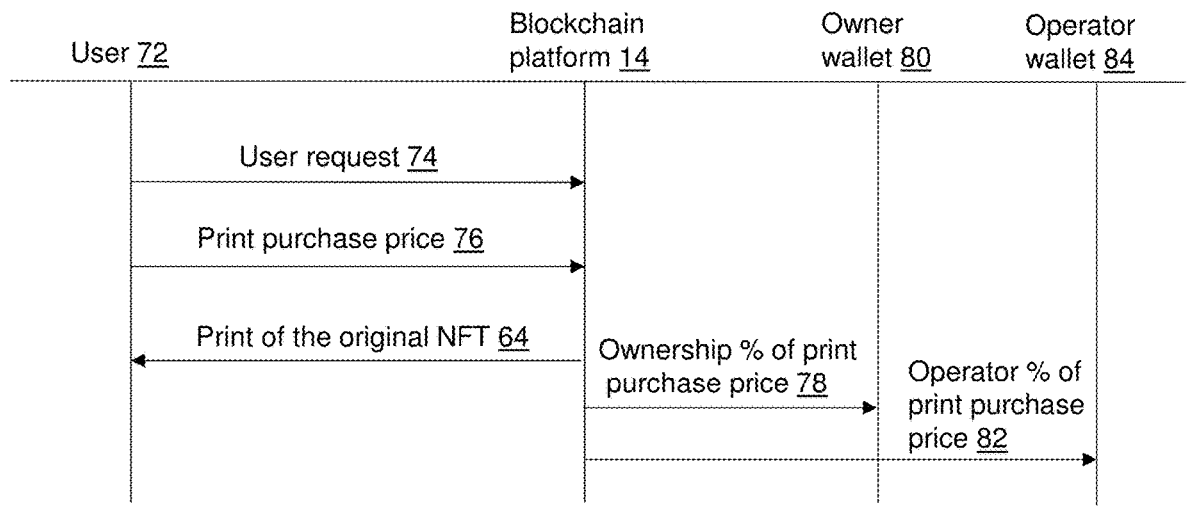
FIG. 8 is a ladder diagram of an exemplary embodiment of a method for generating a market depicting generating a print of an original NFT.

The asset generation logic 30 and the market generation logic 50 may be separate from the content generation logic 37. In the embodiment shown in FIG. 8, generating and purchase of a print 64 of an original NFT 34 is shown. A user 72 sends a purchase request 74 to the blockchain platform 14. The user 72 also sends the print purchase price 76. For example, the blockchain platform 14 may determine the print purchase price 76 upon receiving the user request 74 and inform the user 72 of the print purchase price 76 after receiving the purchase request 74. The blockchain platform 14 generates the print 64 and transfers the print 64 of the original NFT 34 to the user 72. As described above, the blockchain platform 14 transfers the ownership percentage 78 of the print purchase price to the owner wallet 80 of the owner of the original NFT 34 that is associated with the purchase print 64. The blockchain platform 14 also transfers the operator percentage 82 of the print purchase price to the operator wallet 84.

In one embodiment, the original NFT 34 is associated with content. For example, the original NFT 34 may be associated with generated content as described above or the original NFT 34 may be associated with existing content. As an example, the original NFT 34 may include a universal resource identifier (URI) that is associated with content (e.g., an image, music file, video, etc.). In one embodiment, the URI includes a universal resource locator (URL) that points to a storage device (e.g., a server) that stores the content. In another embodiment, the content is a song made by an artist and the URI of the original NFT 34 may match a URI provided by a website of the artist.

Figure 9:
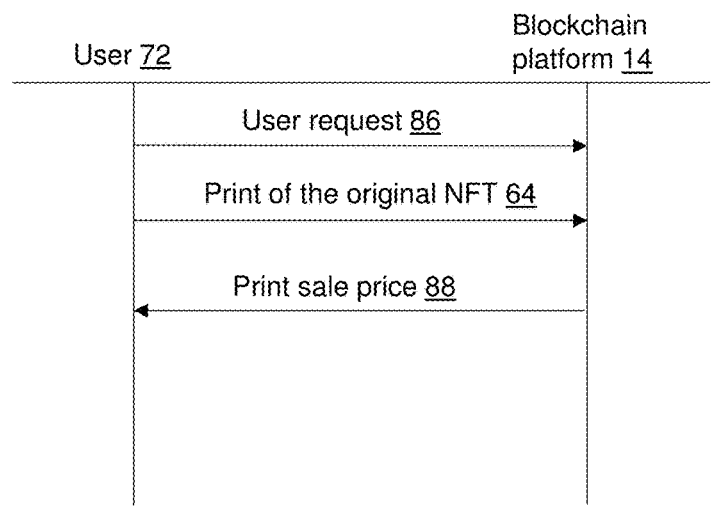
FIG. 9 is a ladder diagram of an exemplary embodiment of a method for generating a market depicting burning a print of an original NFT.

In the embodiment shown in FIG. 9, burning of a print is shown (i.e., sale of a print). The owner of a print 64 sends a sale request 86 to the blockchain platform 14 and the print 64. The print 64 is destroyed and the print sale price 88 is transferred to the user's wallet.

The electronic device 12 may include any suitable type of a computing device, such as a smartphone, a laptop computer, a desktop computer, a game console, a tablet, and/or any other suitable type of computing device.

The processor 16 of the electronic device may have various implementations. For example, the processor 16 may include any suitable circuitry, such as a processor (e.g., CPU), programmable circuit, integrated circuit, memory and I/O circuits, an application specific integrated circuit, microcontroller, complex programmable logic device, other programmable circuits, or the like. The processor 16 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor 16. The processor 16 may be communicatively coupled to the computer readable medium and network interface through a system bus, mother board, or using any other suitable structure known in the art.

As will be understood by one of ordinary skill in the art, the computer readable medium (memory) 18 may be, for example, one or more of a buffer, a flash memory, a hard drive, a removable media, a volatile memory, a non-volatile memory, a random-access memory (RAM), or other suitable device. In a typical arrangement, the computer readable medium 18 may include a non-volatile memory for long term data storage and a volatile memory that functions as system memory for the processor 18. The computer readable medium 18 may exchange data with the circuitry over a data bus. Accompanying control lines and an address bus between the computer readable medium 18 and the circuitry also may be present. The computer readable medium 18 is considered a non-transitory computer readable medium.

The blockchain platform 14 may include a publicly managed blockchain platform (such as Ethereum or the like) or a privately managed platform (e.g., a blockchain controlled by a private entity). In some implementations, the electronic device 12 may be configured to mine and thereby validate transactions submitted to the blockchain platform 14. Similarly, the blockchain platform 14 may be comprised of a number of computing devices (also referred to as nodes) configured to validate and execute transactions submitted to the blockchain platform 14. The transactions may include one or more of: (i) purchasing an original NFT 34, (ii) purchasing a print 64 of an original NFT 34, (iii) selling prints 64.

The system 10 may include the blockchain platform 14 and a plurality of digital wallets (e.g., the reserve fund, the owner wallet, and the operator wallet). In some implementations, the blockchain platform 14 implements a distributed ledger that is available in its entirety to the users of the blockchain platform 14.

Furthermore, the blockchain platform 14 may implement a peer-to-peer transaction mechanism that utilizes public-private key cryptography, has no central intermediary or central repository, and allows all participants in the blockchain platform 14 to hold and validate a full copy of the ledger. In some implementations, the blockchain platform 14 may be maintained by a public distributed network, such as the Ethereum network or the like. Additionally or alternatively, in some implementations, the blockchain platform 14 may be managed by a privately-managed network. Furthermore, the type of implementation of the blockchain platform 14 (e.g., the hashing process associated with proof of work and/or consensus protocol) may vary, as well, in different implementations of the system 10. The present disclosure is not limited to any specific implementation of the blockchain platform 14 and modifications made thereto would still be within the scope and spirit of the present disclosure.

Any of the wallets may be a key store application which may include, store, and/or otherwise control at least one private key along with a public key that corresponds to the private key. These keys enable the signing of transactions on the blockchain platform 14 and allow the client device of the user who owns the wallet to interact on behalf of the user with the blockchain platform 14. In some respects, controlling the private key represents control of an asset that is transacted using the public (or private) key, such as shares in a player or prize funds.

Although in the examples described above the original NFTs 34 and the prints 64 are described as being stored on the electronic device, alternative implementations are possible in which the original NFTs 34 and prints 64 are stored on the blockchain platform 14. For example, the original NFT and the prints of the original NFT may comply with the ERC20 or ERC721 standard.

As described above the logic 30, 37, 38, 40, 50 may be represented by one or more contracts 70. The logic 30, 37, 38, 40, 50 may alternatively be organized in another modular arrangement. That is, the present disclosure is not limited to any specific organization of the logic 30, 37, 38, 40, 50.

Any contract that is deployed on the blockchain platform 14 may include processor-executable instructions that are executed and/or validated by one or more nodes in the blockchain platform 14. Any contract that is deployed on the blockchain platform 14 may be viewed as an autonomous agent that is executed inside the environment of the blockchain platform 14 always executing a specific code when triggered by a message or transaction and having a direct control over their own key store (e.g., wallet) to keep track of persistent variables.

Each original NFT 34 and print 64 may be represented as a transaction that is recorded on the ledger of the blockchain platform 14 and stored in a specific wallet (e.g., an owner wallet of the user owning the original NFT 34 or print 64).

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for provisioning content generation on a blockchain platform, said method comprising:
   generating an original non-fungible token (NFT) having a token seed using the blockchain platform, wherein the generating is performed using asset generation logic including one or more processor-executable instructions located on the blockchain platform;
   receiving with an internet browser one or more processor-executable instructions comprising a general purpose programming language, wherein a content generation logic on the blockchain platform includes the one or more processor-executable instructions;
   algorithmically generating by the internet browser using Euler totient functions a visual artwork and a music piece of the original NFT from the token seed of the original NFT using the received one or more processor-executable instructions, such that:
   the visual artwork comprises a grid having a bottom row and a last column both assigned to a different percussion instalment included in the music piece; and
   the visual appearance of the bottom row and the last column changes in time with corresponding changes in time of the different assigned percussion instruments of the music piece; and playing the generated visual artwork and music piece on the internet browser.

2. The method of claim 1, wherein the visual artwork and the music piece are directly playable on the internet browser without requiring an interpreter.

3. The method of claim 1, further comprising, before generating the original NFT, receiving a user request to generate the original NFT.

4. The method of claim 1, further comprising:
determining with the blockchain platform a total current supply of prints of the original NFT comprising a number of existing prints of the original NFT that are currently in supply;
calculating with the blockchain platform a print purchase price for generating a print of the original NFT as a semi-fungible NFT based on a bonding curve and the determined total current supply of prints of the original NFT using market generation logic including one or more processor executable instructions; and
when a print purchase order has been received and when electronic funds covering the print purchase price have been transferred to a reserve fund from a user, generating a print of the original NFT by executing a transaction on the blockchain platform, wherein the print of the original NFT has a print token seed based on the token seed of the original NFT, such that the visual artwork and the music piece of the original NFT are generatable by the internet browser using the content generation logic and the token seed of the print of the original NFT.

5. The method of claim 4, wherein the print token seed of the print of the original NFT matches the token seed of the original NFT.

6. The method of claim 4, further comprising, when the electronic funds for the new print of the original NFT have been transferred to the reserve fund:
transferring an ownership percentage of the electronic funds to an owner wallet using the blockchain platform; or
transferring an operator percentage of the electronic funds to a network operator wallet using the blockchain platform.

7. The method of claim 4, further comprising:
calculating using the blockchain platform a sale price for burning a print of the original NFT based on the bonding curve and the total current supply of prints of the original NFT; and
when a print sale order has been received from a selling user that owns one of the existing prints of the original NFT: executing a transaction on the blockchain platform removing the existing print of the original NFT owned by the selling user from the selling user, and transferring the sale price to a wallet of the selling user.

8. The method of claim 4, wherein the asset generation logic, the content generation logic, and the market generation logic are included in a contract.

9. The method of claim 1, further comprising:
limiting the generation of the original NFT, such that a maximum number of original NFTs are generated by the blockchain platform; and
for each of the generated original NFTs, separately calculating the print purchase price of the original NFT based on the bonding curve of the original NFT and the total current supply of prints of the original NFT.

10. An electronic device for provisioning content generation on a blockchain platform comprising at least one processor and a memory operatively coupled to the at least one processor and being configured to store processor-executable instructions, which when executed by the at least one processor cause the at least one processor to perform a method comprising the steps of:
allocating asset generation logic on the blockchain platform, the asset generation logic including one or more processor-executable instructions that when executed cause the blockchain platform to:
generate an original non-fungible token (NFT) having a token seed;
allocating content generation logic on the blockchain platform including one or more processor-executable instructions comprising a general purpose programming language, such that the one or more processor-executable instructions of the content generation logic are accessible to an internet browser;
wherein when the one or more processor-executable instructions of the content generation logic are executed by the internet browser, the internet browser:
algorithmically generates using Euler totient functions a visual artwork and a music piece of the owner NFT from the token seed of the original NFT, such that:
the visual artwork comprises a grid having a bottom row and a last column both assigned to a different percussion instrument included in the music piece; and
the visual appearance of the bottom row and the last column changes in time with corresponding changes in time of the different assigned percussion instruments of the music piece; and
plays the visual artwork and the music piece.

11. The electronic device of claim 10, wherein the visual artwork and the music piece are directly playable on the internet browser without requiring an interpreter.

12. The electronic device of claim 10, wherein, when executed by the at least one processor, the processor-executable instructions are further configured to cause the at least one processor to perform the following additional steps of the method:
determining with the blockchain platform a total current supply of prints of the original NFT comprising a number of existing prints of the original NFT that are currently in supply;
calculating with the blockchain platform a print purchase price for generating a print of the original NFT as a semi-fungible NFT based on a bonding curve and the determined total current supply of prints of the original NFT using market generation logic including one or more processor executable instructions;
receive with the blockchain platform a print purchase order and a transfer of electronic funds covering the print purchase price from a user to a reserve fund; and
after the receipt of the print purchase order and after the transfer to the reserve fund from the user of the electronic funds covering the print purchase price, generating a print of the original NFT by executing a transaction on the blockchain platform, wherein the print NFT of the original NFT has a print token seed based on the token seed of the original NFT, such that the artwork and the music piece of the original NFT are generatable using the content generation logic and the token seed of the print of the original NFT.

13. The electronic device of claim 12, wherein, when the electronic funds for the new print NFT have been transferred to the reserve fund:
- transferring an ownership percentage of the electronic funds to an owner wallet using the blockchain platform; or
- transferring an operator percentage of the electronic funds to a network operator wallet using the blockchain platform.

14. The electronic device of claim 12, further comprising:
- calculating using the blockchain platform a sale price for burning a print of the original NFT based on the bonding curve and the total current supply of prints of the original NFT; and
- when a print sale order has been received from a selling user that owns one of the existing prints of the original NFT: executing a transaction on the blockchain platform removing the existing print of the original NFT owned by the selling user from the selling user and transferring the sale price to a wallet of the selling user.

15. The electronic device of claim 12, wherein the asset generation logic, the content generation logic, and the market generation logic are included in a contract.

16. The electronic device of claim 10, further comprising:
- limiting the generation of the original NFT, such that a maximum number of original NFTs are generated by the blockchain platform; and
- for each of the generated original NFTs, separately calculating the print purchase price of the original NFT based on the bonding curve of the original NFT and the total current supply of prints of the original NFT.

* * * * *